(12) United States Patent
Ahn et al.

(10) Patent No.: US 7,564,615 B2
(45) Date of Patent: Jul. 21, 2009

(54) COLOR ELECTROPHORETIC DISPLAY

(75) Inventors: Seong Deok Ahn, Daejeon (KR); Seung Youl Kang, Daejeon (KR); Chul Am Kim, Daejeon (KR); In Kyu You, Daejeon (KR); Gi Heon Kim, Daejeon (KR); Ji Young Oh, Daejeon (KR); Kyu Ha Baek, Daejeon (KR); Kyung Soo Suh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 216 days.

(21) Appl. No.: 11/300,757

(22) Filed: Dec. 14, 2005

(65) Prior Publication Data

US 2006/0139748 A1   Jun. 29, 2006

(30) Foreign Application Priority Data

Dec. 14, 2004   (KR) ............... 10-2004-0105761
May 9, 2005     (KR) ............... 10-2005-0038558

(51) Int. Cl.
    *G02B 26/00*   (2006.01)
(52) U.S. Cl. ..................................... 359/296
(58) Field of Classification Search ......... 359/265–275, 359/296; 430/31, 32, 34, 38; 345/105, 107; 204/450, 600; 349/33
    See application file for complete search history.

(56) References Cited

U.S. PATENT DOCUMENTS

| | | | |
|---|---|---|---|
| 3,613,758 A * | 10/1971 | Gawlick et al. ............... 149/15 |
| 5,961,804 A | 10/1999 | Jacobson et al. | |
| 6,262,706 B1 | 7/2001 | Albert et al. | |
| 6,327,072 B1 | 12/2001 | Comiskey et al. | |
| 6,784,953 B2 | 8/2004 | Liang et al. | |
| 6,788,449 B2 | 9/2004 | Liang et al. | |
| 7,118,838 B2 * | 10/2006 | Fletcher et al. ............... 430/32 |
| 7,123,238 B2 * | 10/2006 | Lin et al. ..................... 345/107 |
| 7,256,766 B2 * | 8/2007 | Albert et al. ................. 345/107 |

FOREIGN PATENT DOCUMENTS

KR   2003-0069339 A   8/2003

* cited by examiner

*Primary Examiner*—Rick L Mack
*Assistant Examiner*—Tuyen Q Tra
(74) *Attorney, Agent, or Firm*—Blakely, Sokoloff, Taylor & Zafman LLP

(57) ABSTRACT

Provided are a color electrophoretic display and a method of manufacturing the same. The color electrophoretic display includes: a plurality of lower electrodes arranged on a lower layer and disposed with a predetermined interval therebetween; a plurality of first to third photoresist chambers arranged on the plurality of lower electrodes; first to third electronic inks accommodated in the plurality of first to third photoresist chambers respectively, and discriminatively operating to an electric field to independently display red, green, and blue colors; and a plurality of upper electrodes disposed with a predetermined interval therebetween and facing the plurality of lower electrodes with the plurality of first to third photoresist chambers being held therebetween.

12 Claims, 7 Drawing Sheets

COLOR ELECTROPHORETIC DISPLAY

CROSS-REFERENCE TO RELATED APPLICATION

This application claims priority to and the benefit of Korean Patent Application No. 2004-105761, filed Dec. 14, 2004, and No. 2005-38558, filed May 9, 2005, the disclosure of which is incorporated herein by reference in its entirety.

BACKGROUND

1. Field of the Invention

The present invention relates to a display and more particularly, to a color electrophoretic display (electronic paper) in which red color electronic ink, green color electronic ink, and blue color electronic ink are formed using a photoresist sheet and an exposure process and are sequentially arranged, and a method of manufacturing the same.

2. Discussion of Related Art

An electrophoresis phenomenon means a phenomenon that charged particles move when an electric field is applied between both electrodes. When the electrophoresis occurs within a dielectric fluid, the charged particles move at a velocity determined by a viscous drag, charges, dielectric properties of the fluid, and a magnitude of the applied electric field.

An electrophoretic display using the above-described electrophoresis phenomenon has most superior properties including a high resolution, a wide viewing angle, a bright white background like the existing paper and ink among display media, and can advantageously implemented on any substrates such as plastic, metal, sheet, and so forth. Such an electrophoretic display can be applied to an e-newspaper, an e-magazine, an e-book replacing the existing newspaper, magazine, book or the like, and an information display media of a mobile communication device such as a cellular phone, a personal digital assistant (PDA), or the like.

The electrophoretic display determines a color using particles having one or more colors suspended in a dielectric fluid. That is, when an electric field is applied to particles having one or more colors, two kinds of particles having an opposite polarity to each other move toward an electrode having a polarity opposite to a polarity of the applied electric field. As a result, a change in color can visually viewed.

The electrophoretic display has bistability. That is, it maintains the color prior to removal of the electric field is removed even after the applied electric field is removed. For these advantages, many researches have been conducted since Ota has first proposed a reflective display using the electrophoresis phenomenon in the early 1970s (see I. Ota, J. Ohnishi, and M. Yoshiyama, Proc. IEEE 61, 1973 p832). However, the electrophoretic display proposed by Ota had problems in stability. That is, density of charged particles within a fluid is made to be the same as that of the fluid to prevent the charged particles from being precipitated. However, clustering and agglomeration of particles occurred due to the suspension instability according to a time, which were brought to a severe difficulty in being put into a commercial use (see P. Murau and B. Singer, J. Appl. Phys. 49, 1978 p4820). These problems were not overcome until the late 1990s from 1980s so that the researches could not significantly advance.

E-ink branched from the MIT Media Lab in 1996 has solved these problems using a microcapsule to some extent (see U.S. Pat. Nos. 6,262,706, 6,262,833, and 5,916,804). The microcapsule can contribute to spatially separate particles so that clustering and agglomeration are reduced. An electrophoretic display using the microcapsule will be briefly described below.

FIGS. 1A and 1B illustrate an electrophoretic display using a microcapsule in accordance with the related art. As shown in FIG. 1A, the electrophoretic display has a lower electrode 13 and a lower electrode protective layer 15 on a lower layer 11. A microcapsule 17 is formed on the lower electrode protective layer 15. The microcapsule 17 is configured to have a transparent fluid 19, white particles 21 having positive charges, and black particles 23 having negative charges. The lower electrode protective layer 15 acts to protect the lower electrode 13 and separate the lower electrode 13 from the microcapsule 17. And an upper electrode protective layer 24 and an upper electrode 25 are formed on the microcapsule 17. When an electric field is applied to the upper electrode 25 and the lower electrode 13, particles within the microcapsule 17 are moved by the electrophoresis phenomenon. The upper electrode protective layer 24 acts to protect the upper electrode 25 and separate the upper electrode 25 from the microcapsule 17. A transparent upper layer 27 is formed on the upper electrode 25. In the above-described structure, an electric field is not applied between the lower electrode 13 and the upper electrode 25. Accordingly, particles 21 and 23 are suspended within the fluid 19.

As shown in FIG. 1B, when an electric field is applied between the lower electrode 13 and the upper electrode 25, charged particles within the microcapsule 17 are moved toward an electrode having a polarity opposite to the polarity of the charged particles. The movement of the charged particles allows a change in color to be visually viewed.

However, in the case of the electrophoretic display using the above-described microcapsule, a monochrome is displayed using electronic inks of black and white colors, or a color is displayed using a color filter, and researches on the electrophoretic display using color electronic inks are still in progress.

SUMMARY OF THE INVENTION

The present invention is directed to a color electrophoretic display with a novel and simple structure manufactured using a photoresist and an exposure process.

One aspect of the present invention is to provide a color electrophoretic display, which includes: a lower electrode formed on a lower layer; a lower electrode protective layer formed on the lower electrode; a photoresist chamber (room or space) formed from a photoresist sheet and positioned on the lower electrode protective layer; a dielectric fluid accompanied within the chamber and having a transparent color; an electronic ink layer suspended within the dielectric fluid and composed of a red color electronic ink, a green color electronic ink, and a blue color electronic ink which discriminatively operate to an applied electric field; and an upper electrode protective layer and an upper electrode sequentially formed on the electronic ink layer. In this case, charged particles for displaying a red color and charged particles for displaying a white color are present within the red color electronic ink, charged particles for displaying a green color and charged particles for displaying a white color are present within the green color electronic ink, and charged particles for displaying a blue color and charged particles for displaying a white color are present within the blue color electronic ink.

A size of the photoresist chamber may be equal to or less than a size of the pixel. A width of the photoresist chamber is preferably 50 to 300 nm. A height of the photoresist chamber is preferably 10 μm to 1000 μm.

The dielectric fluid may be formed of a visually transparent material. The charged particles may be formed of a material having the same specific gravity as the dielectric fluid.

The charged particles may be composed of particles visually absorbing light or particles visually reflecting light. The charged particles may be composed of red, green, and blue colors to implement a color reflecting only a specific color. The charged particles may be composed of inorganic particles or organic particles.

The lower electrode may be formed of a transparent organic material, a transparent inorganic material, or a mixture containing the transparent organic and inorganic materials. The lower electrode may be formed of an opaque inorganic material, an opaque organic material, or a mixture containing the opaque inorganic and organic materials.

The upper electrode may be formed of a transparent organic material, a transparent inorganic material, or a mixture containing the transparent organic and inorganic materials.

The lower electrode and the upper electrode may have one photoresist chamber where electronic inks for displaying a red color, a green color, or a blue color are injected as one pixel. The lower electrode and the upper electrode may have three photoresist chambers where red, green, and blue electronic inks are injected as one pixel.

The color electrophoretic display may further include a protection layer which is adhered between the lower electrode and the photoresist chamber or between the upper electrode and the photoresist chamber.

Another aspect of the present invention is to provide a method of manufacturing a color electrophoretic display, which includes the steps of: adhering a first photoresist sheet to a prepared auxiliary substrate; exposing the first photoresist sheet using a first mask to form a plurality of first photoresist chambers disposed with a constant interval therebetween and having an opening; injecting a first electronic ink to the plurality of first photoresist chambers through the openings; adhering a second photoresist sheet onto the first photoresist chamber to cover the openings; moving an entire structure upside down to remove the auxiliary substrate; exposing the second photoresist sheet using a second mask to remove the second photoresist sheet formed between the plurality of first photoresist chambers; and repeating the above-described procedure to form a plurality of second and third photoresist chambers disposed with a constant interval therebetween and having second and third electronic inks injected within the respective chambers; and sequentially arranging the first to third photoresist chambers to form a first protective layer on one surface of each of the first to third photoresist chambers where the auxiliary substrate is removed.

The first and second photoresist sheet may be formed of a negative photoresist material or a positive photoresist material.

The first to third electronic inks may be injected into the first to third photoresist chambers using gas compression, gas decompression, or fluid flow control.

The method may further include the step of forming a second protective layer facing the first protective layer with the first to third photoresist chambers being held therebetween after removing the second photoresist sheet adhered to the openings of the first to third photoresist chambers. And the method may further include the steps of forming a first electrode on the first protective layer and forming a second electrode on the second protective layer. In this case, the first protective layer and the first electrode or the second protective layer and the second electrode are transparent.

The above-described color electrophoretic display of the present invention can reliably implement a color by means of a simple process and a novel structure.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1A:
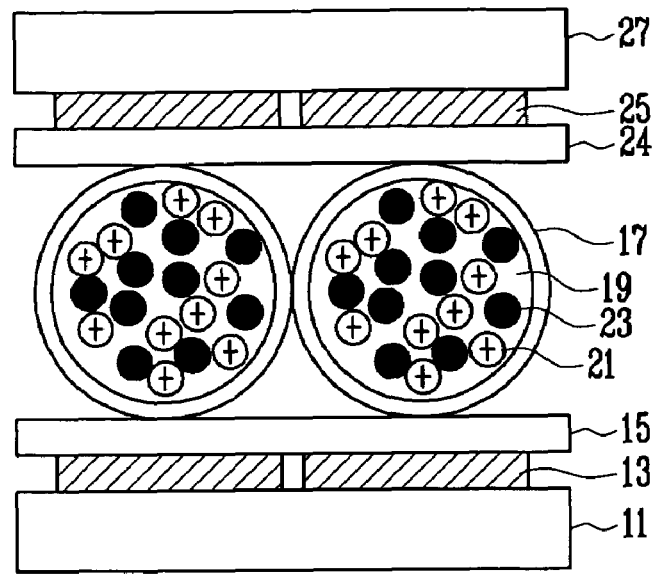
FIGS. 1A and 1B are cross-sectional views illustrating essential components and an operating principle of a capsule type electrophoretic display in accordance with the related art.
Figure 1B:
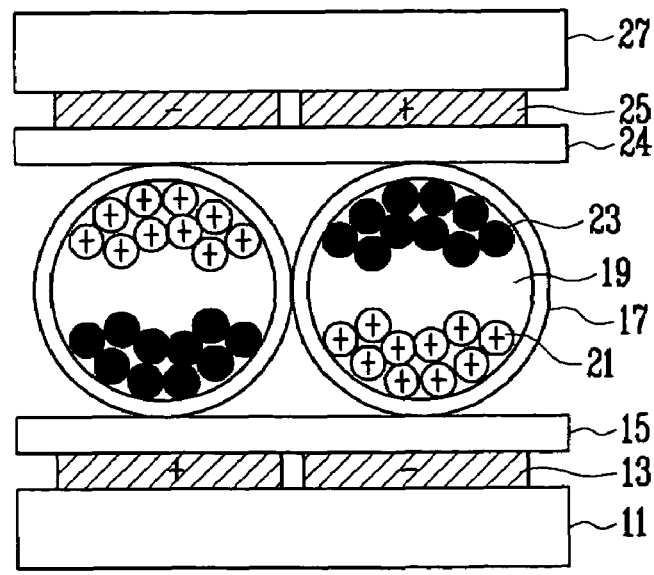

The present invention will now be described more fully hereinafter with reference to the accompanying drawings, in which preferred embodiments of the invention are shown. When a layer is described to be formed on another layer or on a substrate, which means that the layer may be formed on the another layer or on the substrate, or a third layer may be interposed between the layer and the another layer or the substrate. In addition, the thickness of layers and regions are exaggerated for clarity in the drawings. Like numbers refer to like elements throughout the specification.

FIGS. 2A to 2F are partial cross-sectional views illustrating essential components and operating modes of a color electrophoretic display with a photoresist (PR) sheet electronic ink layer structure in accordance with an exemplary embodiment of the present invention.

Figure 2A:
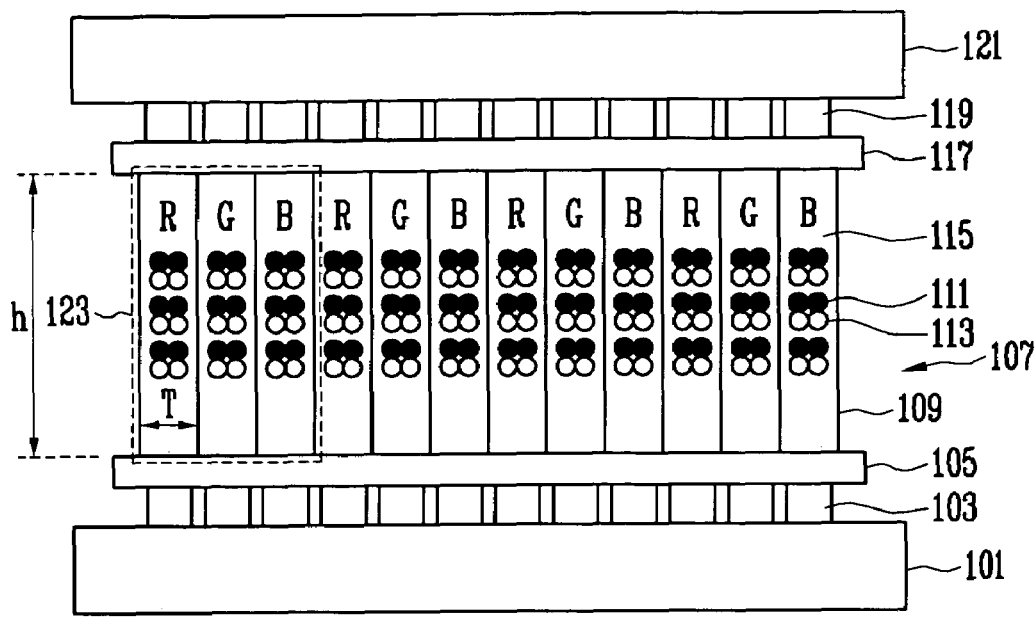
FIG. 2A to 2F are partial cross-sectional views illustrating essential components and operating modes of a color electrophoretic display with a photoresist (PR) sheet structure in accordance with an exemplary embodiment of the present invention.

First, an essential structure of a color electrophoretic display having a photoresist (PR) sheet electronic ink layer structure will be described with reference to FIG. 2A in accordance with an embodiment of the present invention.

A lower electrode 103 and a lower electrode protective layer 105 are formed on a lower layer 101 of a color electrophoretic display having a PR sheet electronic ink layer structure. The lower layer 101 acts to protect and support the lower electrode 103.

The lower electrode 103 is composed of at least one electrode. The lower electrode 103 is formed of an opaque material. In this case, the lower electrode 103 is formed of an opaque inorganic material, an opaque organic material, or a mixture containing the opaque inorganic and organic materials. Alternatively, the lower electrode 103 may be formed of a transparent material. In this case, the lower electrode 103 is formed of a transparent inorganic material, a transparent organic material, or a mixture containing the transparent inorganic and organic materials.

The lower electrode protective layer 105 acts to protect the lower electrode 103 and prevent charged particles from being adhered to the lower electrode 103 by separating the lower electrode 103 from an electronic ink layer 107.

An electronic ink layer 107 where red, green, and blue color electronic inks are injected into the respective photoresist chambers 109 is positioned on the lower electrode protective layer 105. The electronic ink layer 107 may have each photoresist chamber 109 as a pixel or may have three photoresist chambers 123 where red, green, and blue electronic inks are respectively injected as one pixel. In the case of the three photoresist chambers which constitute one pixel, an electric field different from each other may be applied by both electrodes 103 and 119 electrically connected to the respective photoresist chambers 123 to each of the three electronic inks displaying red, green, and blue colors respectively, according to their electric properties.

The photoresist chamber 109 is formed by patterning a photoresist on a sheet through an exposure process using a mask, filling the patterned space with electronic ink, and covering an opening of the patterned space using a protective layer. Most of the existing photoresists which are classified into a positive type and a negative type according to solubility with respect to a development solution of the exposed part can be employed as the photoresist material. An exposed part of the positive photoresist is dissolved in the development solution, and an exposed part of the negative photoresist is cured and is not dissolved in the development solution and a part which is not exposed is dissolved to be shown.

The photoresist chamber 109 has a size or width (T) of 50 μm to 300 μm, and a height of 10 μm to 1000 μm. By way of example, one chamber constitutes a subpixel, its resolution cannot be visually discriminated when the width of the photoresist chamber 109 is less than 50 μm, and the resolution becomes too high to be used when the width exceeds 300 μm, so that it is not a proper size to be used. When the height of the photoresist chamber 109 is less than 10 μm, it is difficult to discriminate colors of two kinds of charged particles, and when it exceeds 1000 μm, a movement time between particles significantly increases, which make it difficult to be put into practical use.

Electronic inks accommodated within the photoresist chamber 109 are configured to have a transparent dielectric fluid 115, and first and second charged particles 111 and 113 suspended within the dielectric fluid 115 and having visually different colors from each other.

The first and second charged particles 111 and 113 discriminatively operate to an applied electric field. The first charged particles 111 become charged particles having a red, green, or blue color, and the second charged particles 113 become charged particle having a white color.

In addition, the first and second charged particles have a size smaller than the width of the photoresist chamber 109. These charged particles 111 and 113 are formed of a material visually reflecting light or a material visually absorbing light. The material visually reflecting or absorbing the light includes an organic material, an inorganic material, and a mixture containing the organic and inorganic materials.

By way of example, the charged particles 111 and 113 may be composed of a core formed of an inorganic oxide particles, and a core shell coated so as to spherically surround the core and including an organic compound with a substituent being bonded to its end. Such a core shell is disclosed in detail in the Korea Patent Registration No. 0473807 which is issued to the same applicant as the present invention.

The dielectric fluid 115 is a liquid which surrounds the charged particles 111 and 113 so as to allow the charged particles 111 and 113 to move by means of an electric field. Such a dielectric fluid 115 is formed of a material visually absorbing light or a material visually reflecting light. The material visually reflecting or absorbing light includes an organic material, an inorganic material, and a mixture containing the organic and inorganic materials.

An upper electrode protective layer 117, an upper electrode 119, and a transparent upper layer 121 are sequentially formed on the electronic ink layer 107. The upper electrode 119 applies an electric field between the upper electrode and the lower electrode 103 to move the charged particles 111 and 113.

The upper electrode 119 is formed of a transparent material. For example, the upper electrode 119 may be formed of a transparent organic material, a transparent inorganic material, or a mixture containing the transparent organic and inorganic materials. The upper electrode protective layer 117 acts to protect the upper electrode 119 and prevent the charged particles 111 and 113 from being adhered to the upper electrode 119 by separating the upper electrode 119 from the electronic ink layer 107.

Next, an operation mode of the color electrophoretic display having a PR sheet structure will be described.

Referring to FIG. 2A again, when an electric field is not applied to the lower electrode 103 and the upper electrode 119 in the color electrophoretic display, the first and second charged particles 111 and 113 of the electronic ink layer 107 for displaying natural colors are suspended at arbitrary positions within the dielectric fluid 115 accommodated within the photoresist chamber 107. The first and second charged particles 111 and 113 are positioned in pairs at an approximately center part of the electronic ink layer 107 in FIG. 2A.

Referring to FIGS. 2B to 2F, when an electric field is applied to both electrodes 103 and 119 of the color electrophoretic display having a PR sheet electronic ink layer structure, the charged particles 111 and 113 within the electronic ink move toward an electrode having a polarity opposite to the polarity of the applied electric field. Movement of these charged particles 111 and 113 allows visual changes in color to be viewed.

Figure 2B:
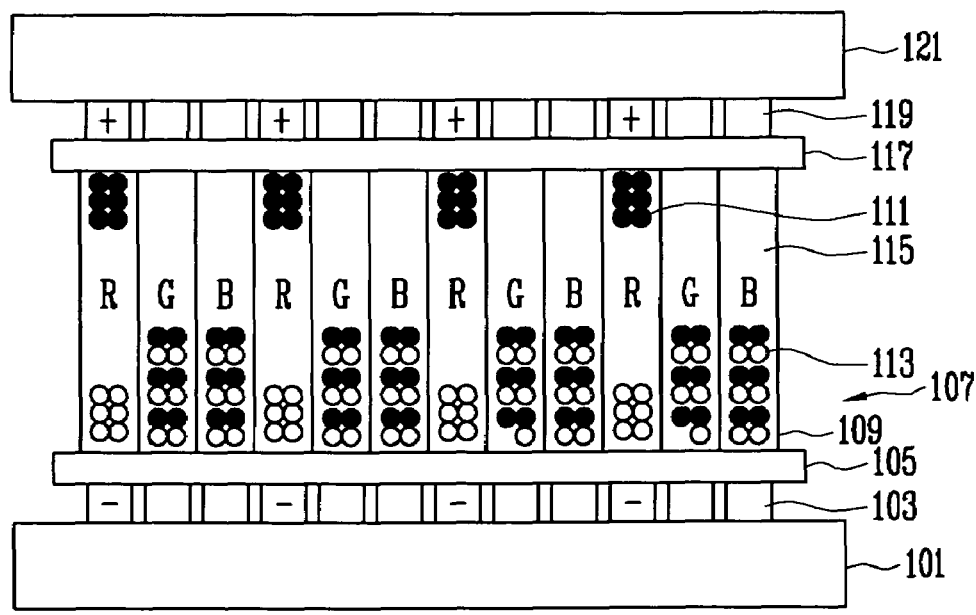
Figure 2C:
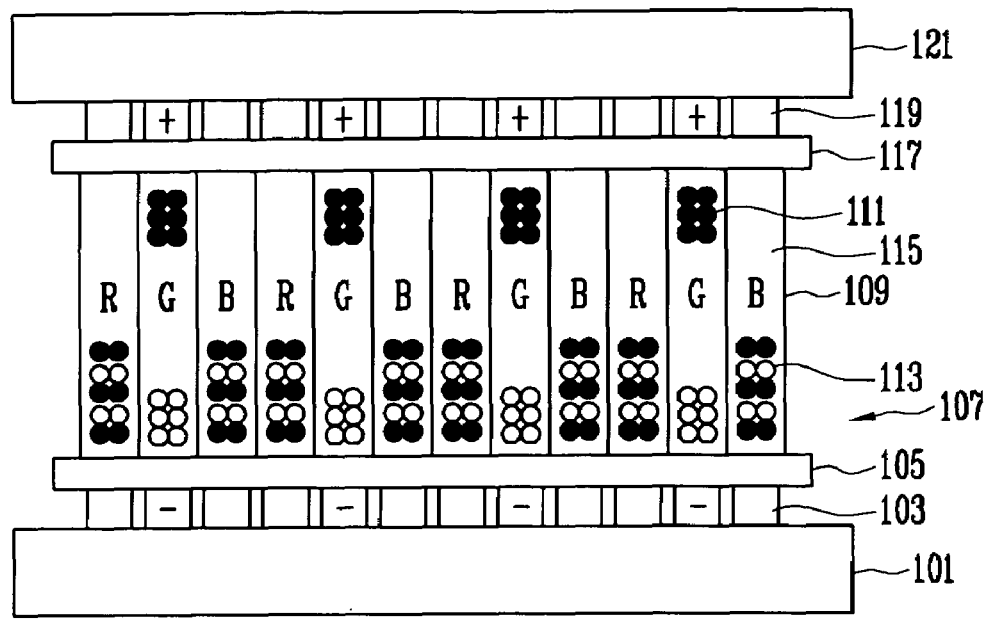
Figure 2D:
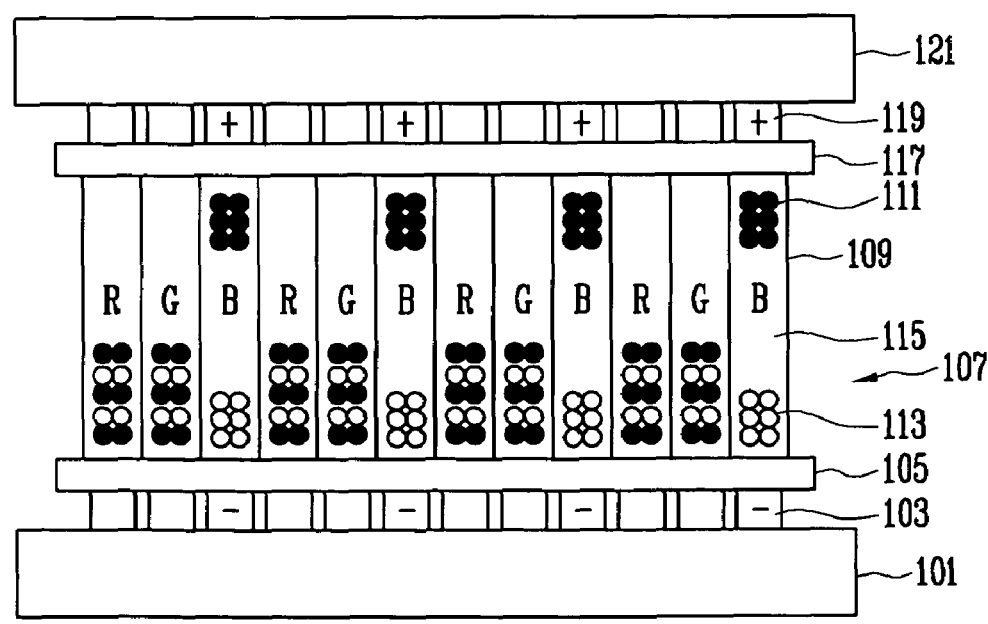
Figure 2E:
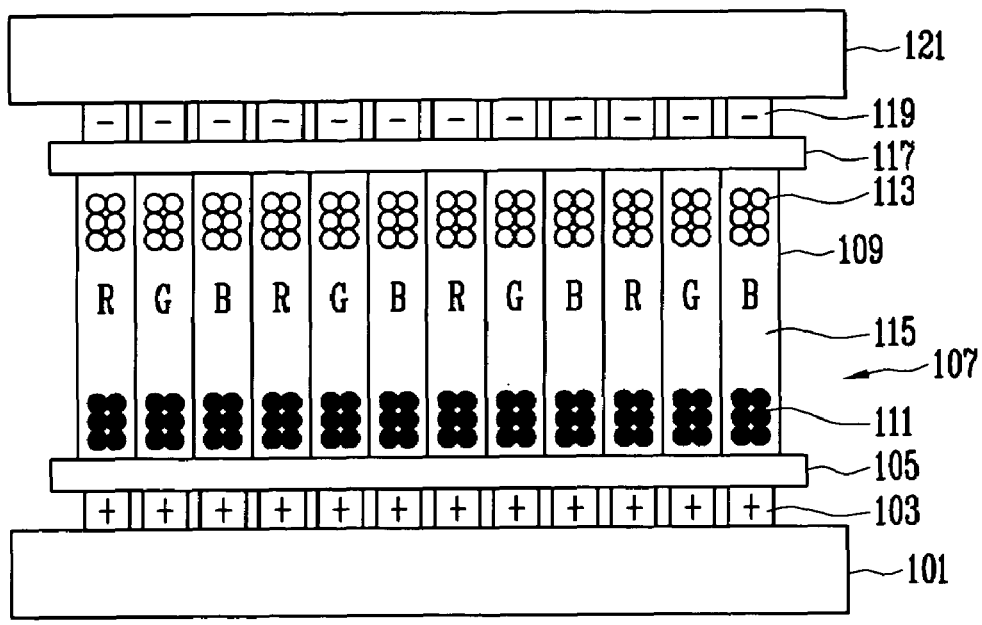
Figure 2F:
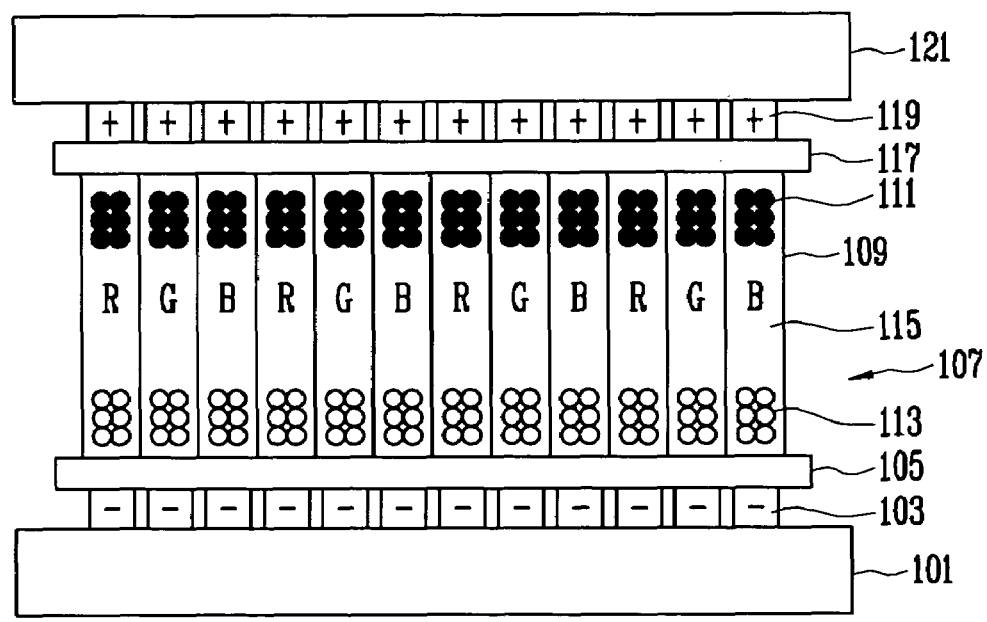

In this case, FIG. 2B shows that the red color charged particles 111 move toward the upper electrode 119 in response to the polarity of the electric field applied to both electrodes 103 and 119, FIG. 2C shows that the green color charged particles 111 move toward the upper electrode 119, FIG. 2D shows that the blue color charged particles 111 move toward the upper electrode 119, FIG. 2E shows that the white color charged particles 113 move toward the upper electrode 119 while the red, green, and blue color charged particles 111 move toward the lower electrode 103, and FIG. 2F shows that the red, green, and blue color charged particles 111 move toward the upper electrode 119 while the white color charged particles 113 move toward the lower electrode 103.

FIGS. 3A to 3H are cross-sectional views illustrating a procedure of manufacturing a color electrophoretic display in accordance with an embodiment of the present invention.

Figure 3A:
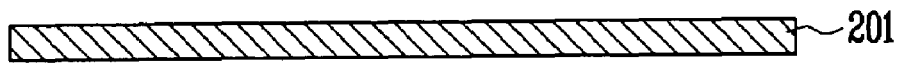
FIGS. 3A to 3H are cross-sectional views illustrating a procedure of manufacturing a color electrophoretic display in accordance with an exemplary embodiment of the present invention.

First, as shown in FIG. 3A, a metal substrate having a proper size, for example, an aluminum substrate, or a metal substrate where a metal layer, for example, an aluminum layer is deposited is prepared as an auxiliary substrate 201. The auxiliary substrate 201 is composed of a substrate to which a photoresist can readily adhere. Alternatively, the auxiliary substrate 201 may be composed of another proper substrate such as a plastic substrate other than the metal substrate.

Figure 3B:
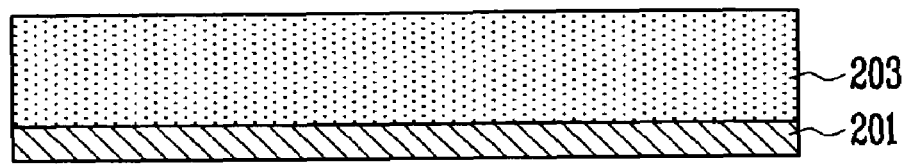

Next, as shown in FIG. 3B, a material having a low adhesive property is coated on the auxiliary substrate 201, and a first photoresist is adhered thereon to form a photoresist layer 203. The photoresist layer 203 may be formed in a sheet shape by adhering a sheet-shaped first photoresist sheet or applying a liquid photoresist.

Figure 3C:
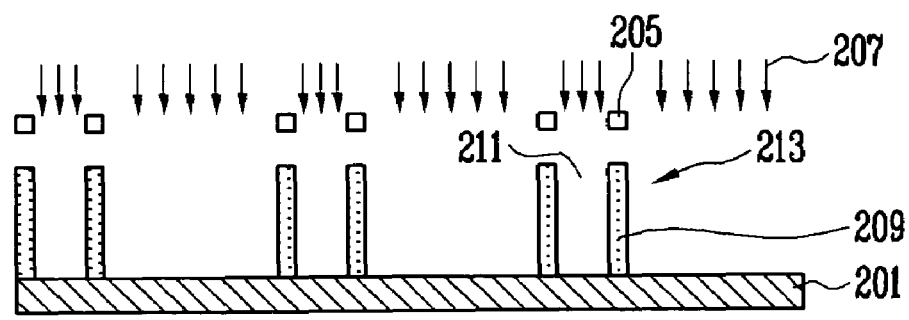

Next, as shown in FIG. 3C, the photoresist layer 203 is exposed (207) using a mask 205 to form a photoresist room or chamber 213 having a predetermined size where a wall 209 and an opening 211 are formed on the photoresist layer 203. The chambers 213 is disposed by a constant interval. By way of example, one chamber 213 is regularly disposed in each of three equally divided parts on the auxiliary substrate 201. A width of the chamber 213 formed on the photoresist layer 203 is 50 μm to 300 μm and its height is 10 μm to 1000 μm. In addition, a size and a height of the chamber 213 are preferably 50 μm to 150 μm, and 50 μm to 200 μm, respectively.

Figure 3D:
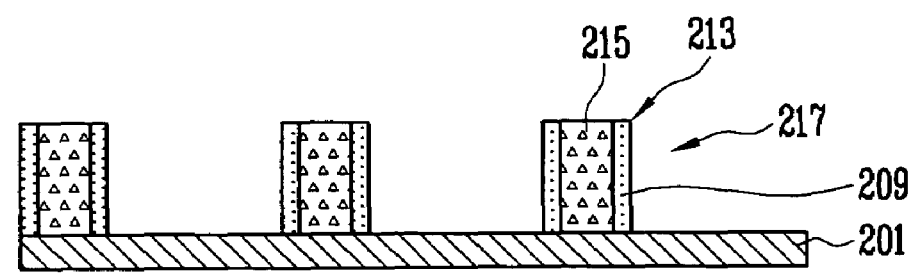

Next, as shown in FIG. 3D, an electronic ink 215 is injected into the chamber 213 formed of a photoresist layer to form a photoresist electronic ink layer 217. In this case, the photoresist electronic ink layer 217 is any one electronic ink layer among red, green, and blue color electronic ink layers for displaying colors in a color electrophoretic display. The photoresist electronic ink layer 217 formed on the auxiliary substrate 201 may be formed, for example, using a method of injecting the electronic ink 215 into the photoresist chamber 203 by means of a micro syringe.

Figure 3E:
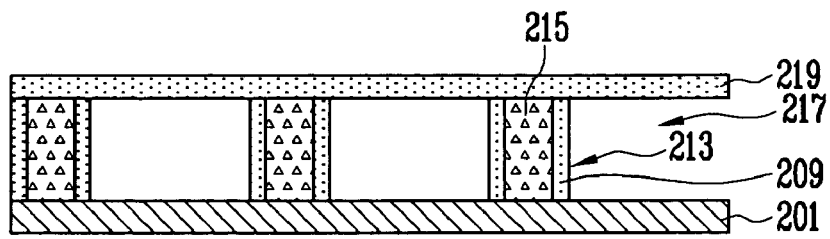

Next, as shown in FIG. 3E, a second photoresist sheet 219 thinner than the first photoresist sheet is adhered to one surface of the chamber 203 which faces the auxiliary substrate 201 so as to cover the opening of the photoresist chamber 203. The second photoresist sheet 219 may be formed of the same material as that of the first photoresist sheet.

Figure 3F:
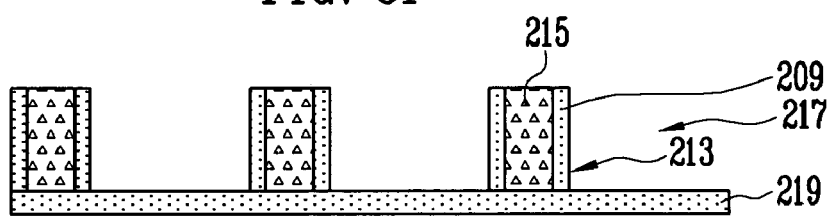

Next, as shown in FIG. 3F, the above-described structure is moved upside down so as to make the second photoresist sheet 219 face downward in the drawing. And the auxiliary substrate 201 is removed. One method of removing the auxiliary substrate 201 is to remove the auxiliary substrate 201 while together removing a material coated with a material having a low adhesive property after the material coated with the material having a low adhesive property is adhered to the auxiliary substrate 201.

Figure 3G:
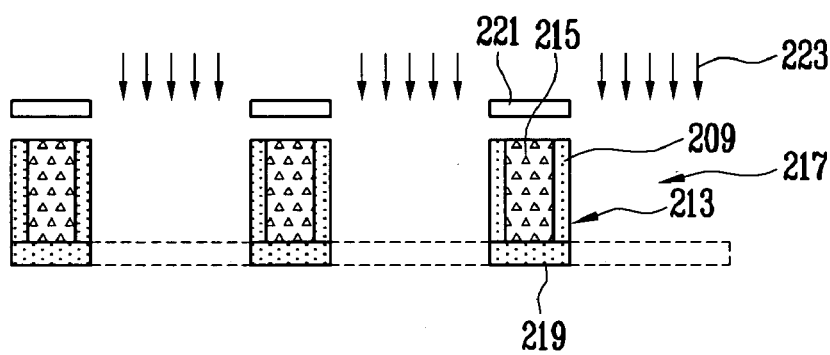

Next, as shown in FIG. 3G, a thin second photoresist sheet 219 is exposed using a mask 221 to form empty spaces for arranging the electronic ink layers of the rest two colors which are to be manufactured in a subsequent process, respectively. Each photoresist chamber 213 of the electronic ink layer 27 is formed as an independent cell in the present procedure.

Figure 3H:
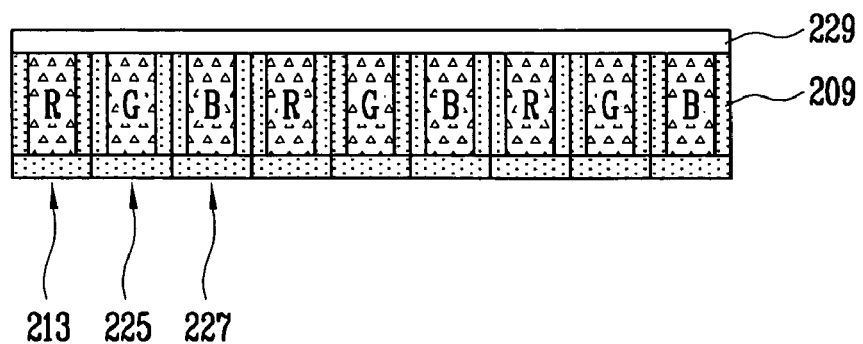

Next, the above-described steps are repeatedly carried out to form a photoresist electronic ink layer composed of red color, green color, and blue color electronic ink chambers capable of forming a color electrophoretic display, and to sequentially and repeatedly arrange a plurality of first photoresist chambers 213 each forming a red color electronic ink layer, a plurality of second photoresist chambers 225 each forming a green color electronic ink layer, and a plurality of third photoresist chambers 227 each forming a blue color electronic ink layer, and a transparent protective layer 229 is adhered onto one surface thereof as shown in FIG. 3H. The above-described procedure allows the color electrophoretic display to be obtained.

Figure 4:
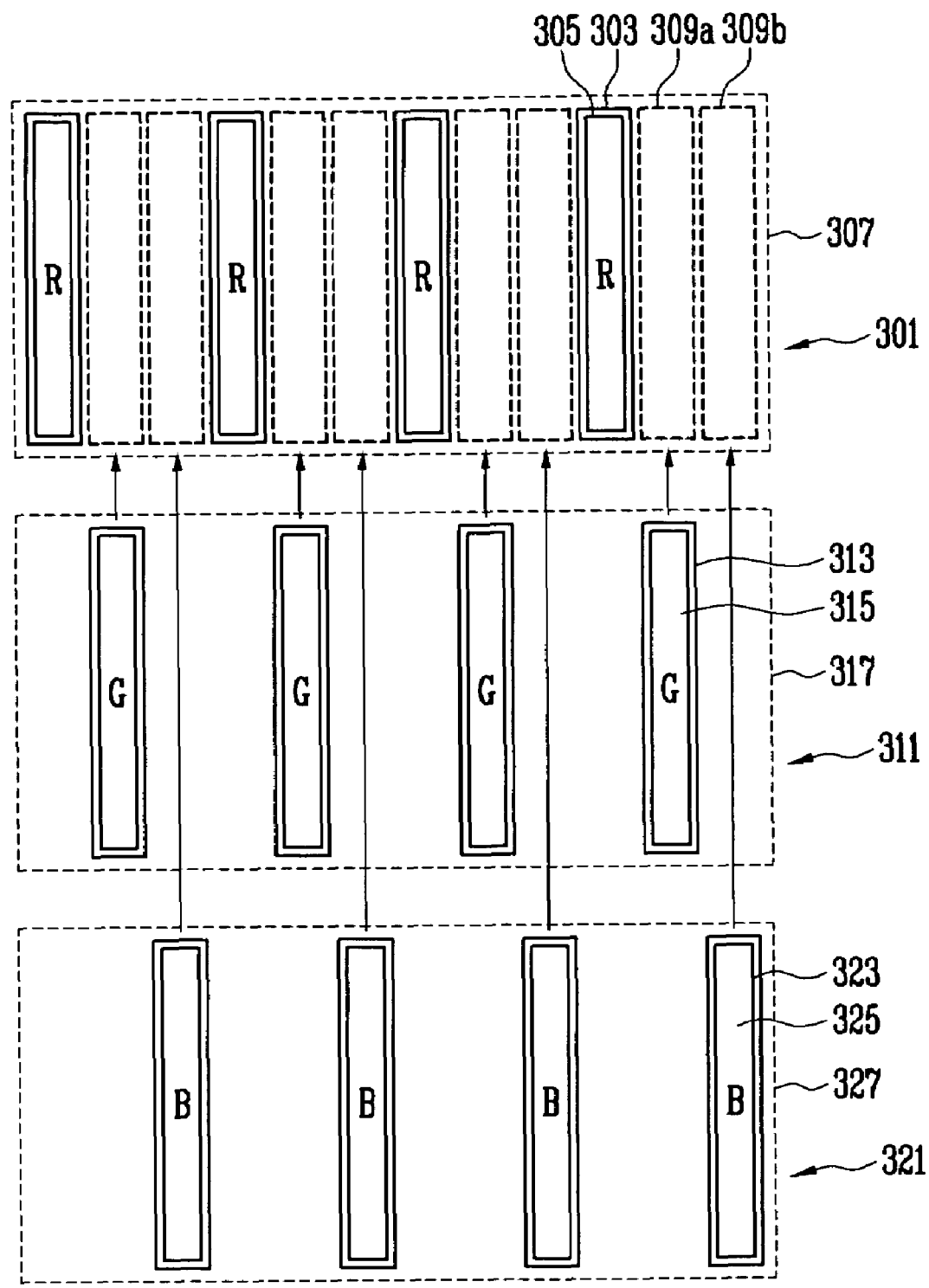
FIG. 4 is a view illustrating formation of red color, green color, and blue color electronic ink layers during the process of manufacturing a color electrophoretic display in accordance with an exemplary embodiment of the present invention.

FIG. 4 is a view illustrating formation of red color, green color, and blue color electronic ink layers during the process of manufacturing a color electrophoretic display in accordance with an exemplary embodiment of the present invention.

Referring to FIG. 4, a red color electronic ink layer 301, a green color electronic ink layer 311, and a blue color electronic ink layer 321 are respectively formed and then sequentially arranged to form a color electrophoretic display. Reference numerals 307, 317, and 327 in FIG. 4 denote portions which were present before parts of the second photoresist sheet were removed.

That is, the color electronic ink layer for the color electrophoretic display according to the present invention is formed by having a plurality of second photoresist chambers 313 disposed by a constant interval and constituting a green color electronic ink layer 311, and a plurality of third photoresist chambers 323 disposed by a constant interval and constituting a blue color electronic ink layer 321 held between a plurality of first photoresist chambers 303 disposed by a constant interval and constituting a red electronic ink layer 301.

In this case, the constant interval represents an interval for forming a space 309a where each of the second photoresist chambers 313 is disposed by a constant interval and constitutes the green color electronic ink layer 311 and a space 309b where each of the third photoresist chambers 323 is disposed by a constant interval and constitutes the blue color electronic ink layer 321. Electronic inks 305, 315, and 325 for displaying red, green, and blue colors are accommodated within the first to third photoresist chambers 303, 313, and 323, respectively.

Alternatively, the above-described color electronic ink layer may be formed in a tiling manner such that a plurality of first to third photoresist chambers 303, 313, and 323, or at least one plurality of first to third photoresist chambers which correspond to red, green, and blue color electronic ink layers 301, 311, and 321 are sequentially arranged.

According to the present invention as described above, photoresist chambers constituting red, green, and blue electronic ink layers may be sequentially arranged using a PR sheet and an exposure process to effectively manufacture a color electrophoretic display.

Accordingly, the color electrophoretic display which has used the conventional color filter can be manufactured with a novel structure and method without requiring the color filter so that a stable color electrophoretic display can be implemented.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:
1. A color electrophoretic display, comprising:
a plurality of lower electrodes arranged on a lower layer and disposed with a predetermined interval therebetween;
a plurality of first to third photoresist chambers arranged on the plurality of lower electrodes wherein the first to third photoresist chambers have a size equal to or less than that of a pixel;
first to third electronic inks accommodated in the plurality of first to third photoresist chambers respectively, and discriminatively operating to an electric field to independently display red, green, and blue colors;
a plurality of upper electrodes disposed with a predetermined interval therebetween and facing the plurality of lower electrodes with the plurality of first to third photoresist chambers being held therebetween; and the first to third electronic inks which are composed of pairs of charged particles having red, green, blue colors, or cyan, magenta, yellow colors and charged particles having a white color, or pairs of two charged particles having a black color and a white color, are dispersed in a dielectric fluid;

wherein the first to third photoresist chambers have a width of 50 to 300 nm.

2. The color electrophoretic display according to claim 1, wherein the first to third photoresist chambers have a height of 10 to 1000 μm.

3. The color electrophoretic display according to claim 1, wherein the dielectric fluid is formed of a visually transparent material.

4. The color electrophoretic display according to claim 1, wherein the charged particles are formed of a material having the same specific gravity as the dielectric fluid.

5. The color electrophoretic display according to claim 1, wherein the charged particles are composed of one of a particle visually absorbing light and a particle visually reflecting light.

6. The color electrophoretic display according to claim 5, wherein the charged particles are composed of one of an inorganic particle and an organic particle.

7. The color electrophoretic display according to claim 1, wherein the lower electrode is formed of any one of a transparent inorganic material, a transparent organic material, and a mixture containing the transparent inorganic and organic materials.

8. The color electrophoretic display according to claim 1, wherein the lower electrode is formed of any one of an opaque inorganic material, an opaque organic material, and a mixture containing the opaque inorganic and organic materials.

9. The color electrophoretic display according to claim 1, wherein the upper electrode is formed of any one of a transparent inorganic material, a transparent organic material, and a mixture containing the transparent inorganic and organic materials.

10. The color electrophoretic display according to claim 1, wherein the lower electrode and the upper electrode make one photoresist chamber into which an electronic ink for displaying any one color of red, green, and blue colors is injected constitute one pixel.

11. The color electrophoretic display according to claim 1, wherein the lower electrode and the upper electrode make at least three photoresist chambers in which the first to third electronic inks for displaying a color are injected constitute one pixel.

12. The color electrophoretic display according to claim 1, further comprising: a protective layer adhered to at least one between the plurality of lower electrodes and the plurality of first to third photoresist chambers, and between the plurality of upper electrodes and the plurality of first to third photoresist chambers.

* * * * *